United States Patent [19]

Hachiya

[11] 4,329,889
[45] May 18, 1982

[54] POWER TRANSMISSION MECHANISM FOR HYBRID TYPE FLY-WHEEL DEVICE

[76] Inventor: Takeo Hachiya, 1956, Ooaza-Nakano, Oora-Gun, Oora-Machi, Gunma, 370-06, Japan

[21] Appl. No.: 190,761

[22] PCT Filed: Apr. 16, 1979

[86] PCT No.: PCT/JP79/00095
§ 371 Date: Jan. 25, 1980
§ 102(e) Date: Jan. 14, 1980

[87] PCT Pub. No.: WO79/01115
PCT Pub. Date: Dec. 13, 1979

[30] Foreign Application Priority Data

May 25, 1978 [JP] Japan .................... 53/61670

[51] Int. Cl.³ ................ B60K 41/06; G05G 1/00
[52] U.S. Cl. ..................... 74/858; 74/856; 74/860; 74/861; 74/872; 74/572; 180/165
[58] Field of Search ............. 192/0.075, 0.076, 3.61; 180/165, 65 A, 54 R; 74/572, 843, 848, 856, 857, 858, 860, 861, 862, 865, 872, 879, 877, 878

[56] References Cited

U.S. PATENT DOCUMENTS

| | | | |
|---|---|---|---|
| 2,291,690 | 8/1942 | Caves | 74/861 X |
| 2,742,986 | 4/1956 | Nallinger | 74/872 X |
| 3,280,653 | 10/1966 | Mooney et al. | 74/572 |
| 3,493,066 | 2/1970 | Dooley | 180/54 |
| 3,749,194 | 7/1973 | Bardwick | 180/165 |
| 3,771,311 | 11/1973 | Herbst | 74/751 X |
| 3,870,116 | 3/1975 | Seliber | 180/165 |
| 3,882,950 | 5/1975 | Strohlein | 74/859 X |
| 3,886,810 | 6/1975 | Sugiyama et al. | 180/165 |
| 3,910,043 | 10/1975 | Clerk | 180/165 |
| 3,923,115 | 12/1975 | Helling | 180/65 A |
| 4,031,420 | 6/1977 | Carini | 74/572 |
| 4,075,542 | 2/1978 | Szegedy | 180/65 A |
| 4,131,171 | 12/1978 | Keyes | 180/54 R |
| 4,171,029 | 10/1979 | Beale | 180/54 R |

FOREIGN PATENT DOCUMENTS

| | | | |
|---|---|---|---|
| 718444 | 3/1942 | Fed. Rep. of Germany | 74/877 |
| 730825 | 1/1943 | Fed. Rep. of Germany | 74/877 |
| 2444564 | 4/1976 | Fed. Rep. of Germany | . |
| 2635804 | 3/1977 | Fed. Rep. of Germany | 74/878 |
| 2637322 | 2/1978 | Fed. Rep. of Germany | 180/165 |
| 52-23449 | 6/1977 | Japan | . |
| 501380 | 2/1939 | United Kingdom | 74/846 |
| 2031822 | 4/1980 | United Kingdom | 180/165 |

*Primary Examiner*—Leslie Braun
*Attorney, Agent, or Firm*—Polster, Polster and Lucchesi

[57] ABSTRACT

The present invention is concerned with a power transmission mechanism for a hybrid type fly-wheel vehicle, in which a fly-wheel is rotated by a drive shaft of an internal combustion engine, and, when the numbers of revolution of the fly-wheel reaches a predetermined value, the internal combustion engine is maintained in its idling state, whereby the propeller shaft is now rotated by the fly-wheel. When the numbers of revolution of the fly-wheel reduces, it is detected to drive the internal combustion engine to again increase the numbers of revolution of the fly-wheel.

Transmission and non-transmission of power between the abovementioned drive shaft and fly-wheel are effected through a clutch mechanism which connects and disconnects in accordance with the numbers of revolution of the internal combustion engine.

4 Claims, 2 Drawing Figures

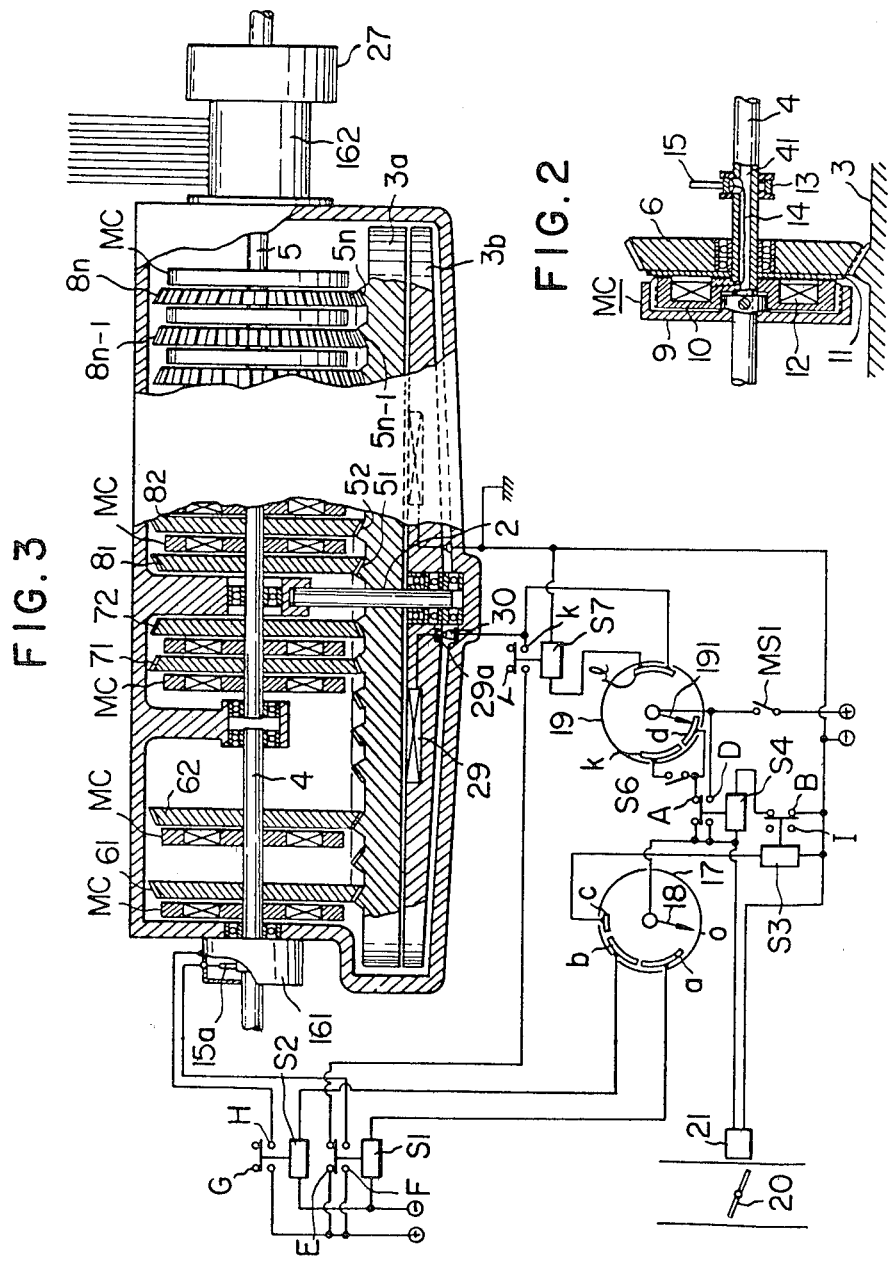

POWER TRANSMISSION MECHANISM FOR HYBRID TYPE FLY-WHEEL DEVICE

TECHNICAL FIELD

This invention relates to a power transmission mechanism for a hybrid type fly-wheel vehicle, in which a fly-wheel is incorporated in a vehicle driven by an internal combustion engine.

BACKGROUND ART

Of recent, it has been desired to attempt, from the resources-saving standpoint, to promote energy saving to those vehicles driven by an internal combustion engine which uses gasoline as its fuel. Up to the present, however, no appropriate energy saving technique has yet been developed to this kind of vehicles.

DISCLOSURE OF INVENTION

The present invention aims at attaining the energy saving purpose by a simple construction of such vehicles with the internal combustion engine as their driving source.

The abovementioned purpose of the present invention can be achieved by a power transmission mechanism for a hybrid type fly-wheel vehicle having a fly-wheel which receives power from a drive shaft of the internal combustion engine, a propeller shaft which receives the power from the fly-wheel, a clutch mechanism which is connected and disconnected in accordance with numbers of revolution of the internal combustion engine provided in a power transmission system for the abovementioned drive shaft and the fly-wheel, a first control mechanism which disconnects the abovementioned clutch mechanism and closes a throttle valve by detecting that the numbers of revolution of the internal combustion engine have increased to a predetermined value, and a second control mechanism which detects decrease in the numbers of revolution of the fly-wheel, opens the abovementioned throttle valve, and again connects the clutch mechanism.

As mentioned above, when the internal combustion engine reaches predetermined numbers of revolution, the numbers of revolution of the internal combustion engine is reduced to that of an idling state and the vehicle is changed to its fly-wheel running, so that the present invention is able to attain the energy saving purpose. In addition, its construction is simple.

BRIEF EXPLANATIONS OF DRAWING

FIG. 2 is a cross-sectional view showing a relationship between an electromagnetic clutch and gear/fly-wheel;

FIG. 3 is an explanatory diagram of operation of another embodiment.

BEST MODE TO PRACTISE THE INVENTION

Figure 1:
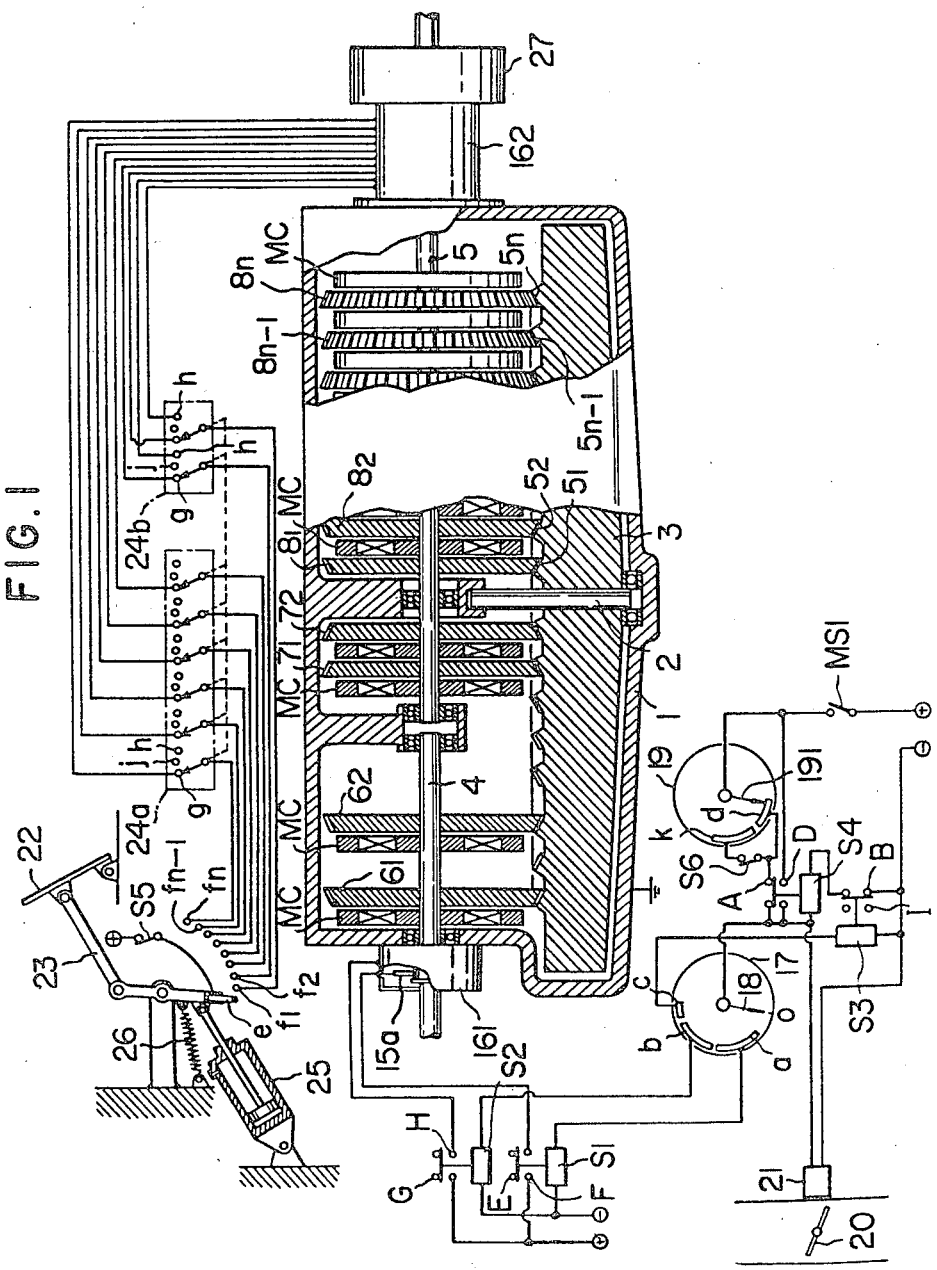
FIG. 1 is an explanatory diagram of operation of one embodiment.

In FIG. 1, 1 refers to a fly-wheel casing, within which a fly-wheel 3 is supported on a shaft 2 in a freely rotatable manner. Also, a drive shaft 4 which receives power from the internal combustion engine and a propeller shaft 5 which is led to a differential gear are respectively supported in a rotatable manner on a side wall and a partition wall of the casing.

A plurality of ring gears $5_1$–$5_n$ are formed in a concentric and circumferential manner on the surface of the abovementioned fly-wheel 3 opposite the shafts 4, 5. The ring gears are meshed with drive gears 61, 62 rotatably supported on the drive shaft 4, reverse gears 71, 72 rotatably supported on the propeller shaft 5, and driven gears $8_1$–$8_n$ disposed in confrontation to the reverse gears with the shaft 2 as the separating point.

FIG. 2 shows one example of the electromagnetic clutch MC which connects and disconnects each of the abovementioned gears with and from the drive shaft 4 or the propeller shaft 5, which is constructed with a rotational disc 9 fixed on the drive shaft 4, a clutch disc 10 spline-connected with the inner peripheral surface of the rotational disc 9, a friction plate 11 fixed on a gear 6 in confrontation to the clutch disc 10, and an electromagnet 12 provided in the clutch disc 10 as an integral part thereof. A ring-shaped contact 13 is fixed on the drive shaft 4, and the contact is connected with the electromagnet 12 through a lead wire 14 passing through a hole 41 (or a groove formed in the outer peripheral surface) of the drive shaft 4. A contact 15 is electrically contacted to the abovementioned ring-shaped contact 13. Electric conduction to the contact piece is controlled by the numbers of revolution of the internal combustion engine and a treading quantity of an accelerator pedal, as will be described later.

The abovementioned contact and contact piece which connect and disconnect each of the electromagnetic clutches MC in the abovementioned drive gears 61, 62, the reverse gears 71, 72, and the driven gears $8_1$–$8_n$ are shielded by covers 161, 162.

17 refers to a tachometer which indicates numbers of revolution of the internal combustion engine, 18 refers to an indicator needle thereof, and a–c refer to electrical contacts provided at the respective positions of 800–1,000, 1,100–3,400, and 3,500 revolutions on an display panel of the tachometer. The contacts a, b are respectively connected to the electromagnetic switches S1, S2 and the contact c is connected to the electromagnetic switch S3. 19 refers to a tachometer to indicate numbers of revolution of the fly-wheel 3, 191 refers to an indicator needle thereof, and d refers to an electrical contact provided at a position of 0–1,000 revolutions on the display panel of the tachometer, which is connected to one of the contacts A of the electromagnetic switch S4.

20 refers to a throttle valve of a carburetor, 21 refers to an energizing coil which controls the throttle valve for its opening and closing.

22 refers to an accelerator pedal. An electrical contact e is provided at the tip end of an oscillating link 23 of the pedal, and a plurality of contacts $f_1$–$f_n$ are provided on a moving locus of the contact e. The contacts $f_1$–$f_n$ are electrically connected with each of the contact pieces in the abovementioned contact cover 162 through advancing-and-reversing lever switch circuits 24a, 24b. The abovementioned advancing-and-reversing lever switch circuits 24a, 24b have an advancing contact g, a reversing contact h, and a neutral contact j, which are jointly changed over by operation of a lever (not shown in the drawing). By treading the abovementioned accelerator pedal 22, the electromagnetic clutches MC of the driven gears $8_1$–$8_n$ and the reverse gears 71, 72 are so constructed that they may be sequentially connected from the center of the fly-wheel to its outer periphery.

25 refers to a control valve mechanism for absorbing shock from braking action, when the accelerator pedal 22 is abruptly released from its state of treading, 26 refers to a tensioning coil spring for the oscillating link 23, and 55 refers to a constantly closed switch which is opened by treading the brake to interrupt electric conduction to the electromagnetic clutches MC of the gears 71, 72, $8_1$-$8_n$ at the time of the abrupt vehicle stoppage. 27 refers to a dumper or hydraulic clutch provided on the propeller shaft 5 to absorb shock from speed changing operation.

In the following, explanations will be made as to the operations of the FIG. 1 embodiment.

When the internal combustion engine is started and the main switch MS1 is closed, there is formed a circuit routing a power source (+)→the main switch MS1→the indicator needle 191 of the fly-wheel tachometer→the contact d→a contact A of the electromagnetic switch S4→the electromagnetic switch S4→a contact B of the electromagnetic switch S3→the power source (−), whereby the electromagnetic switch S4 is changed-over to a contact D. At the same time, the energizing coil 21 of the throttle valve 20 is electrically conducted through the contact D, so that the throttle valve 20 is opened.

When the numbers of revolution of the internal combustion engine increases and the indicator needle 18 of the tachometer contacts the contact a, the electromagnetic switch S1 is electrically conducted, whereby it is changed over from a contact E to a contact F. At the same time, there is formed a circuit routing the power source (+)→the contact F of the electromagnetic switch S1→the contact piece 15a→the electromagnetic clutch MC of the first drive gear 61→ground, whereby the electromagnetic clutch MC is connected and the power of the drive shaft 4 is transmitted to the fly-wheel 3 through the gear 61. Further, when the numbers of revolution of the internal combustion engine increases and the indicator needle 18 contacts the contact b, the electromagnetic switch S2 changes over from a contact G to a contact H, wherey the electromagnetic clutch MC of the second drive gear 62 is now connected. As the result of this, the power from the drive shaft 4 is transmitted to the fly-wheel 3 through the gear 62, and the numbers of revolution of the fly-wheel increases.

When the advancing-and-reversing lever is shifted to the advancing side, the switch circuit 24a is changed over to the contact point g, and the accelerator pedal 22 is trod, the electromagnetic clutches MC of the driven gears $8_1$-$8_n$ are sequentially connected and the driving force of the fly-wheel 3 is transmitted to the propeller shaft 5 through the driven gear $8_1$-$8_n$, whereby the vehicle runs forward.

When the numbers of revolution of the internal combustion engine reaches 3,500 revolutions, the indicator needle 18 of the tachometer 17 contacts a contact C, whereby there is formed a circuit routing the power source (+)→the main switch MS1→the contact D of the electromagnetic switch S4→the indicator needle 18→the contact C→the electromagnetic switch S3→the power source (−), and the electromagnetic switch S3 is changed over to a contact I. At the same time, as the electric conduction to the electromagnetic switch S4 is interrupted, the switch S4 is changed over to the contact A. In this case, the indicator needle 191 of the fly-wheel tachometer is at a position off the contact d, because the numbers of revolution of the fly-wheel has increased to 1,000 revolutions and above. On account of this, electric conduction to the energizing coil 21 of the throttle valve 20 is interrupted, and the throttle valve 20 is closed. In other words, the internal combustion engine is brought to a state of idling (700 revolutions or so), and the vehicle is in a fly-wheel running.

When the numbers of revolution of the fly-wheel decreases, and the indicator needle 191 contacts the contact d, the electromagnetic switch S4 is electrically conducted, and changes over from the contact A to the contact D with the consequence that the throttle valve 20 opens by the action of the energizing coil 21, and the numbers of revolution of the internal combustion engine increases again.

For reversing the vehicle, the operating lever is shifted to the reverse position to change the switch circuit 24b over to the contact h.

The contact k provided at the side of the speed higher than the electrical contact d of the fly-wheel tachometer 19 (the numbers of revolution of the fly-wheel being 2,000 or so) is to maintain high speed running without decreasing the numbers of revolution of the fly-wheel 3 to an extreme degree. When the contact k and the contact A side of the electromagnetic switch S4 are closed, the energizing coil 21 is electrically conducted as long as the contact k and the indicator needle 191 are in mutual contact, and the throttle valve 20 is opened. As the consequence of this, the power from the drive shaft 4 is transmitted to the fly-wheel 3 to maintain rotation of the fly-wheel 3 at a high speed.

In the above-described construction, when the treading of the accelerator pedal is released at the time of the vehicle speed being reduced for stoppage, the contact e gradually returns from $f_n$ to $f_1$ by the action of the control valve mechanism, and each of the electromagnetic clutches MC of the driven gears $8_1$ to $8_n$ is disconnected from $8_n$ to $8_1$. During this period, the rotational force of the wheels is accumulated in the fly-wheel 3 through the propeller shaft 5 and the driven gears $8_n$-$8_1$ so as to be prepared for the subsequent abrupt start. At the time of the abrupt vehicle stoppage, the brake pedal is trod to open the switch S5 thereby opening the entire clutches of the driven gears $8_1$-$8_n$. As the consequence of this, no driving force from the wheels is accumulated in the fly-wheel, and the vehicle can be stopped safely and without failure.

Incidentally, it is also possible that, instead of the control valve 25, the intervals among the contacts $f_1$-$f_n$ are constructed with proximity switches and delay timers so as to be controlled in accordance with the vehicle speed.

FIG. 3 shows another embodiment, in which the abovementioned fly-wheel is divided into two portions of the first fly-wheel 3a and the second fly-wheel 3b. The second fly-wheel 3b is rotatably supported on the shaft 2, and has an energizing coil 29 at a position opposite the first fly-wheel 3a.

l refers to a contact provided at the high speed side of the fly-wheel tachometer 19, and is connected to the electromagnetic switch S7. One of the contacts K of the electromagnetic switch S7 is connected to the power source through the contact E. On the other contact, there is provided a contact piece 30 through a lead wire to be contacted to the contact 29a of the energizing coil 29.

When the mechanism is constructed as mentioned above, the rotational force of the wheels is transmitted to the first fly-wheel 3a through the propeller shaft 5 and the driven gears $8_1$-$8_n$ in the steps ranging from speed reduction to stoppage of the vehicle. And, when the numbers of revolution of the first fly-wheel 3a increases, the indicator needle 191 of the tachometer contacts the contact l, whereby there is formed a circuit routing the power source (+)→the main switch S1→the indicator needle 191→the contact point l→the electromagnetic switch S7→the power source (−), and the contact L of the electromagnetic switch S7 is changed over to the contact K. At the same time, there is formed another circuit routing the power source (+)→the contact E of the electromagnetic switch S1→the contact K of the electromagnetic switch S7→the contact piece 30→the energizing coil 29→ground, and the energizing coil 29 is electrically conducted. On account of this, the second fly-wheel 3b also rotates together with the first fly-wheel 3a to accumulate therein the rotational force of the wheels. Accordingly, recovery rate of the braking energy becomes high, which can be utilized as the energy for the subsequent starting.

Even when the indicator needle 191 gets off the contact l, the electromagnetic switch S7 is self-sustained. When the first fly-wheel 3a is rotated by the internal combustion engine, as the contact E of the electromagnetic switch S1 has been changed over to the contact F, the electromagnetic switch S7 is released from its self-sustaining state, and no electric conduction is effected to the energizing coil 29 of the second fly-wheel 3b, so that there is no possibility of the second fly-wheel 3b becoming a load to the internal combustion engine.

I claim:

1. A power transmission mechanism for a hybrid type fly-wheel vehicle, comprising in combination:
   (a) a casing;
   (b) a drive shaft connected to an internal combustion engine, and supported in one part of said casing;
   (c) at least one fly-wheel rotatably supported on a shaft which is disposed perpendicularly to said drive shaft;
   (d) a propeller shaft held in said casing in alignment with said drive shaft and which receives driving power from said fly-wheel;
   (e) a plurality of ring gears formed concentrically and circumferentially on the surface of said fly-wheel;
   (f) drive gears rotatably supported on the drive shaft;
   (g) reverse gears and driven gears rotatably supported on said propeller shaft, said driven gears being separated from, and confronting to, said reverse gears with said fly-wheel supporting shaft as a separating point;
   (h) an electromagnetic clutch mechanism coaxially provided on each of said drive gears, reverse gears, and driven gears, said clutch mechanism functioning to connect and disconnect each said gear in accordance with numbers of revolution of the internal combustion engine;
   (i) a first control mechanism which disconnects said electromagnetic clutch mechanism, and closes a throttle valve by detecting increase in the numbers of revolution of the internal combustion engine to a predetermined value; and
   (j) a second control mechanism which opens said throttle valve, and connects said electromagnetic mechanism again by detecting decrease in the numbers of revolution of said fly-wheel to a predetermined value.

2. The power transmission mechanism as set forth in claim 1, wherein said fly-wheel comprises first and second fly-wheel components, and said second fly-wheel component is provided with an electrically energizing means to connect and disconnect said second fly-wheel component to said first fly-wheel component when said first fly-wheel component reaches its predetermined numbers of revolution.

3. A power transmission mechanism for a hybrid type fly-wheel vehicle, comprising in combination:
   (a) a casing;
   (b) a drive shaft connected to an internal combustion engine, and supported in one part of said casing;
   (c) at least one fly-wheel rotatably supported on a shaft which is disposed perpendicularly to said drive shaft;
   (d) a propeller shaft held in said casing in alignment with said drive shaft and which receives driving power from the fly-wheel;
   (e) a plurality of ring gears formed concentrically and circumferentially on the surface of said fly-wheel;
   (f) drive gears rotatably supported on said drive shaft;
   (g) reverse gears and driven gears rotatably supported on said propeller shaft, said driven gears being separated from, and confronting to, said reverse gears with said fly-wheel supporting shaft as a separating point;
   (h) a first electromagnetic clutch mechanism coaxially provided on each of said drive gears to connect and disconnect each said gear in accordance with numbers of revolution of the internal combustion engine;
   (i) a first control mechanism to disconnect said first clutch mechanism and close a throttle valve by detecting increase in the numbers of revolution of the internal combustion engine to a predetermined number;
   (j) a second control mechanism to open said throttle valve and connect said first clutch mechanism again by detecting decrease in the numbers of revolution of said fly-wheel to a predetermined number;
   (k) a second electromagnetic clutch mechanism coaxially provided on each of said reverse gear and driven gears to connect and disconnect each said gear in accordance with speed increasing and decreasing operations of an accelerator operating section; and
   (l) a third control mechanism which disables function of said accelerator operating section in association with stopping operating of a brake operating section to release said second electromagnetic clutch mechanism.

4. The power transmission mechanism as set forth in claim 3, wherein said fly-wheel comprises first and second fly-wheel components, and said second fly-wheel component is provided with an electrically energizing means to connect and disconnect said second fly-wheel to said first fly-wheel when said first fly-wheel component reaches its predetermined numbers of revolution.

* * * * *